United States Patent [19]

Sato

[11] Patent Number: 4,691,939
[45] Date of Patent: Sep. 8, 1987

[54] RELEASE SYSTEM FOR SEAT OCCUPANT IN VEHICLE

[75] Inventor: Yoshimi Sato, Yokohama, Japan

[73] Assignee: Nissan Motor Company, Limited, Yokohama, Japan

[21] Appl. No.: 790,157

[22] Filed: Oct. 22, 1985

[30] Foreign Application Priority Data

Nov. 14, 1984 [JP] Japan .................... 59-240334
Nov. 28, 1984 [JP] Japan .................... 59-181194[U]

[51] Int. Cl.⁴ .................................... B60R 22/36
[52] U.S. Cl. ............................. 280/806; 280/801
[58] Field of Search ............ 280/801, 802, 806, 807, 280/808

[56] References Cited

U.S. PATENT DOCUMENTS 4,189,022  2/1980  Lazich et al. ............... 280/801
4,234,209 11/1980  Ikesue ......................... 280/806
4,291,897  9/1981  Minami ........................ 280/802
4,432,119  2/1984  Schwark et al. ............ 280/801

FOREIGN PATENT DOCUMENTS

2373423  8/1978  France ........................ 280/801
50-39920  4/1975  Japan .
56-44755  4/1981  Japan .
56-64842  5/1981  Japan .

Primary Examiner—John J. Love
Assistant Examiner—Ross Weaver
Attorney, Agent, or Firm—Schwartz, Jeffery, Schwaab, Mack, Blumenthal & Evans

[57] ABSTRACT

An inventive release system for a seat occupant restrained by a seat belt in a vehicle can be operated both inboard and outboard. The system includes a seat belt retractor locked in response to abrupt deceleration or collision, a mechanism emergency-releasing the retractor after the retractor has been locked, and a manual control including a control terminal exerting a control power for actuating the mechanism and also including inboard and outboard control lever mechanism manually actuated to move the control terminal.

18 Claims, 9 Drawing Figures

RELEASE SYSTEM FOR SEAT OCCUPANT IN VEHICLE

CROSS-REFERENCE TO RELATED APPLICATION

This application for patent has a copending application for patent entitled RELEASE SYSTEM FOR SEAT OCCUPANT IN VEHICLE and based on the Japanese utility model application No. 59-153936.

BACKGROUND OF THE INVENTION

1. Field of the Invention

This invention relates to a release system for a seat occupant restrained by a seat belt in a vehicle and particularly to an emergency release system for a seat occupant in an automotive vehicle.

2. Description of the Prior Art

Japanese published unexamined utility model application No. 50-39920 discloses a prior art automatic seat belt restraint and release system for an automotive vehicle. This system automatically moves one end of a lap belt combined with a shoulder belt, i.e. a webbing forward or backward along a side sill in order to release or restrain a seat occupant as a side door is opened or closed, respectively.

U.S. Pat. No. 4,291,897 discloses a prior art manual release mechanism for use with a webbing retractor built into a console box of an automotive vehicle. This release mechanism comprises a manual release linkage for a pawl which interlocks with ratchet wheels of the retractor in case of collision involving the automotive vehicle. The manual release linkage must be operated inboard by a seat occupant, who may be unconscious, in shock, or otherwise incapable of operating same.

Therefore, after the collision of the automotive vehicle, if a stunned seat occupant cannot operate the manual release mechanism by himself and release a side door lock mechanism in cases where the door is locked, rescue personnel must break the side door windowpane in order to open the side door and operate the manual release mechanism or must open a back door in order to operate the manual release mechanism. This manual release mechanism makes the rescue of the shocked seat occupant inefficient and may confuse rescue personnel trying to operate it.

SUMMARY OF THE INVENTION

A primary object of this invention is to provide a release system for a seat occupant restrained by a seat belt in a vehicle which can be operated both inboard and outboard. In order to achieve this object, the inventive system includes a seat belt retractor locked in abrupt deceleration or collision, means for emergency-releasing the seat belt retractor after the seat belt retractor has been locked, and a manual control comprising a control terminal exerting control power to actuate the emergency-releasing means and comprising inboard and outboard control leverage means manually actuated to move the control terminal. According to this system, a rescuer outside the vehicle can operate the system to release a stunned seat occupant, e.g. after a collision involving the vehicle and quickly rescue the seat occupant.

Another object of this invention is to provide a release system for a seat occupant restrained by a seat belt in a vehicle which can indicate the location of the manual control in order to achieve a quick rescue not only in day but at night.

DESCRIPTION OF THE PREFERRED EMBODIMENTS

The preferred embodiments of this invention will be described below with reference to FIGS. 1 to 9.

FIRST EMBODIMENT

Figure 1:
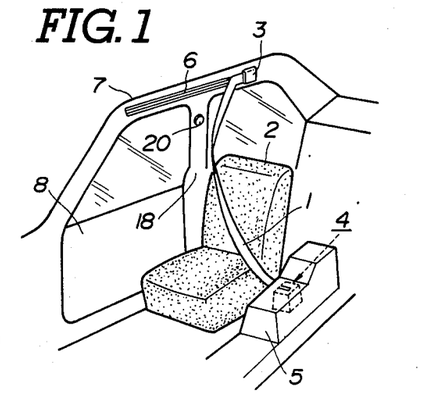
FIG. 1 is a perspective view showing the arrangement of a release system for a seat occupant in an automotive vehicle according to a first embodiment of this invention.

As shown in FIG. 1, the upper end of a webbing 1 passing diagonally over a seat 2 is attached to a movable anchor plate 3 and the lower end of the webbing 1 is wound onto a seat belt retractor 4 of the emergency-locking type in a central console box 5. The anchor plate 3 is movably mounted on a guide rail 6 extending axially along the inboard surface of a roof side rail 7. When a side door 8 is opened, the anchor plate 3 is moved forward by an electrical motor (not shown) controlled by a door switch (not shown) actuated by the side door 8 so that the webbing 1 automatically releases the occupant of a seat 2. On the other hand, when the side door 8 is closed, the anchor plate 3 is moved backward by the motor so that the webbing 1 automatically restrains the seat occupant.

Figure 2:
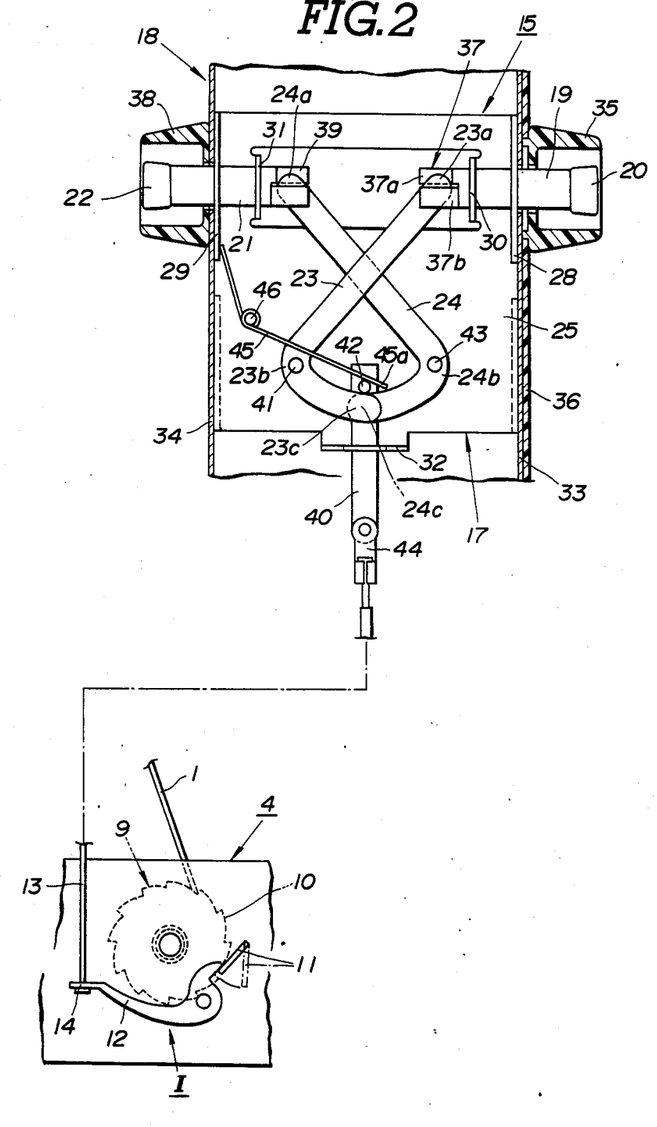
FIG. 2 is a diagram of the release system of FIG. 1.

As shown in FIG. 2, the retractor 4 comprises a spool 9 constantly trying to retract the webbing 1, a pair of ratchet wheels 10 mounted on opposite ends of the spool 9, a pawl 11 capable of meshing with both of the ratchet wheels 10, and a shock sensor (not shown), e.g. a pendulum for tilting the pawl 11 clockwise as viewed in FIG. 2 in case of abrupt deceleration, e.g. collision so as to lock the ratchet wheels 10. The spool 9 is continuously biased in the direction of retraction of the webbing 1, i.e. clockwise as viewed in FIG. 2, by the biasing force of a spring (not shown).

As shown in FIG. 2, an emergency spool-release mechanism I comprises a spool-release lever 12 for disengaging the pawl 11 from the ratchet wheels 10, and a Bowden cable 13 capable of pulling the operating end 14 of the spool-release lever 12 up in order to actuate the spool-release lever 12.

A manual emergency release control 15 is mounted at a suitable point on the vehicle body, e.g. the top part of a hollow center pillar 18 as shown in FIG. 1 or somewhere on the side door 8. The manual emergency release control 15 comprises a chassis 17 built into the center pillar 18, an inboard slide plate 19 with an inboard emergency release knob 20, an outboard slide plate 21 with an outboard emergency release knob 22, a first L-shaped control lever 23 actuated by the inboard slide plate 19, a second L-shaped control lever 24 actuated by the outboard slide plate 21, and a plate-like control terminal 40 actuable by either of the control levers 23 and 24.

Figure 3:
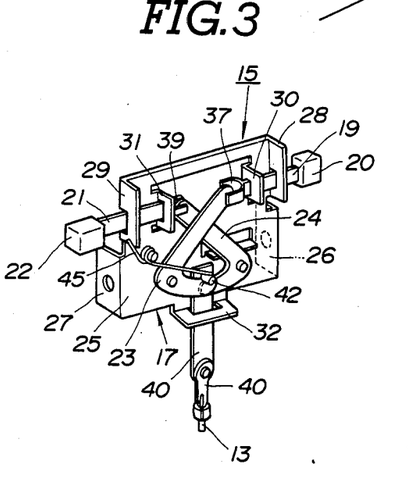
FIG. 3 is a perspective view of an emergency release control in the release system of FIG. 2.

The chassis 17 traverses the center pillar 18 and, as best shown in FIG. 3, comprises a rectangular mounting plate 25, a pair of plate-like flanges 26 and 27 projecting backwards at lower parts of both the sides of the mounting plate 25, a pair of plate-like slide bearings 28 and 29 projecting forward from the upper parts of opposite sides of the mounting plate 25, two cut-out-plate-like slide bearings 30 and 31 projecting forward and parallel to the slide bearings 28 and 29, and a plate-like slide bearing 32 projecting forward from the center of the bottom of the mounting plate 25. The flanges 26 and 27 are firmly attached, e.g. by welding to inner surfaces of inner and outer walls 33 and 34 respectively of the center pillar 18.

The inboard slide plate 19 is slidably mounted through the slide bearings 28 and 30. The outer end of the inboard slide plate 19 on which the inboard emergency release knob 20 is fixed projects into the passenger compartment and is surrounded by an annular finish 35 made of elastic material and built into a center pillar trim 36. Alternatively, the finish 35 may have a lid concealing the inboard emergency release knob 20. The inner end of the inboard slide plate 19 terminates at a yoke 37. One branch 37a of the yoke 37 is made by bending an upper part of the inboard slide plate 19 backwards. The other branch 37b of the yoke 37 is formed by bending a lower part of the inboard slide plate 19 forward. The inner surface of the fork of the yoke 37 is in contact with an operating end 23a of the first control lever 23.

The outboard slide plate 21 is of the same structure as the inboard slide plate 19 and is slidably mounted through the slide bearings 29 and 31. The outer end of the outboard slide plate 21 projects outside the passenger compartment. The outboard emergency release knob 22 is surrounded by a finish 38 similar to the finish 35 and is mounted on the outer surface of the pillar outer wall 34. The inner end of the outboard slide plate 21 terminates at a yoke 39. The inner surface of the fork of the yoke 39 is in contact with the operating end 24a of the second control lever 24.

The L-shaped control levers 23 and 24 are of the same structure and positioned in mirror symmetry to each other. The angle 23b of the first control lever 23 projects toward the outboard and is pivotably mounted on a pin 41 fixed to the mounting plate 25 of the chassis 17. The upper surface of the working end 23c of the first control lever 23 is contact with the bottom of the cylindrical surface of a pin 42 fixed to the top part of the control terminal 40. The angle 24b of the second control lever 24 projects toward the inboard and is pivotably mounted on a pin 43 similar to the pin 41, so that the vertical arms of the L-shaped control levers 23 and 24 cross each other. The working end 24c of the second control lever 24 overlaps the working end 23c of the first control lever 23. Therefore, the upper surface of the working end 24c of the second control lever 24 is contact with the bottom of the cylindrical surface of the pin 42. The arrangement of the control levers 23 and 24 can reduce the overall size of the emergency release control 15.

The control terminal 40 is slidably mounted through the slide bearing 32 and can be moved vertically by the control levers 23 and 24 via the pin 42. An anchor plate 44 of the Bowden cable 13 is fixed to the lower end of the control terminal 40. The top of the cylindrical surface of the pin 42 is constantly urged downwards by one end 45a of a torsion coil spring 45 which is mounted on a pin 46 fixed to the chassis 17. The other end of the torsion coil spring 45 abuts the slide bearing 29 so as to yield a clockwise spring force as viewed in FIG. 2 at the first end 45a of the torsion coil spring 45.

When the automotive vehicle is moving normally or is at rest, the pawl 11 is out of engagement with the ratchet wheels 10 so that the seat occupant can freely extract and retract the seat belt 1.

In case of abrupt deceleration or collision, the pawl 11 is forced into engagement with the ratchet wheels 10 by the pendulum so as to lock the spool 9. Therefore, when an emergency-restrained seat occupant pushes the inboard emergency release knob 20 by himself, the first control lever 23 moves countercockwise as viewed in FIG. 2 to pull up the control terminal 40 via the pin 42. Thus, the Bowden cable 13 disengages the pawl 11 from the ratchet wheels 10 via the spool-release lever 12.

On the other hand, when a stunned seat occupant cannot push the inboard emergency release knob 20, a rescuer can push the outboard emergency release knob 22. Thus, the second control lever 24 moves clockwise as viewed in FIG. 2 to disengage the pawl 11 from the ratchet wheel 10. Therefore, the rescuer can quickly release the stunned seat occupant for rescue.

Figure 4:
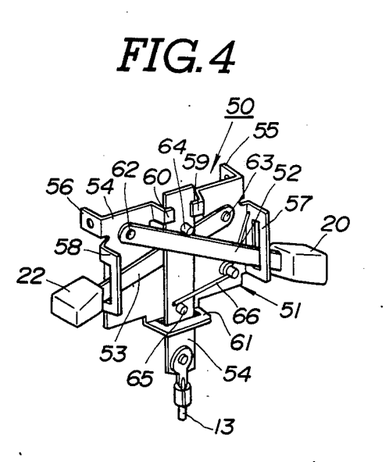
FIG. 4 is a perspective view of a modification to the emergency release control of FIG. 3.

FIG. 4 illustrates a modification to the manual emergency release control 15. This modified manual emergency release control 50 comprises a chassis 51, an inboard control lever 52 with an inboard emergency release knob 20, an outboard control lever 53 with an outboard emergency release knob 22, and a plate-like control terminal 54 actuable by either of the control levers 52 and 53.

The chassis 51 comprises a rectangular mounting plate 54, a pair of flanges 55 and 56 projecting backwards from the upper corners of the mounting plate 54, a pair of guide plates 57 and 58 projecting forward from the centers of both of the vertical edges the mounting plate 54, a pair of cut-out slide bearings 59 and 60 projecting forward and opposed to each other from the center of the top edge of the mounting plate 54, and a plate-like slide bearing 61 projecting forward from the center of the bottom edge of the mounting plate 54.

The inboard control lever 52 is straight and has one end pivotably mounted on the mounting plate 54 via a pin 62. Similarly, the outboard control lever 53 is straight and has one end pivotably mounted on the mounting plate 54 via a pin 63. The inboard control lever 52 crosses over the outboard control lever 53 so as to sandwich the control terminal 54. The upper surfaces of the respective inboard and outboard control levers 52 and 53 are in contact with the lower-most surface of a pin 64 fixedly extending through the control terminal 54.

This control terminal 54 extends through the pair of the slide bearings 59 and 60 and the slide bearing 61 and has the above-described pin 64 near its upper end. This control terminal 54 also has a pin 65 near its lower end. One end of a torsion coil spring 66 constantly depresses the pin 65 in a manner similar to the torsion coil spring 45 of FIGS. 2, 3. The biasing force of the torsion coil spring 66 sets the inboard and outboard control levers 52 and 53 at their rest positions shown in FIG. 4.

Pulling up either of the inboard and outboard emergency release knobs 20 and 22 disengages the pawl 11 from the ratchet wheels 10 via the Bowden cable 13 and the spool-release lever 12.

SECOND EMBODIMENT

Figures 5, 6:
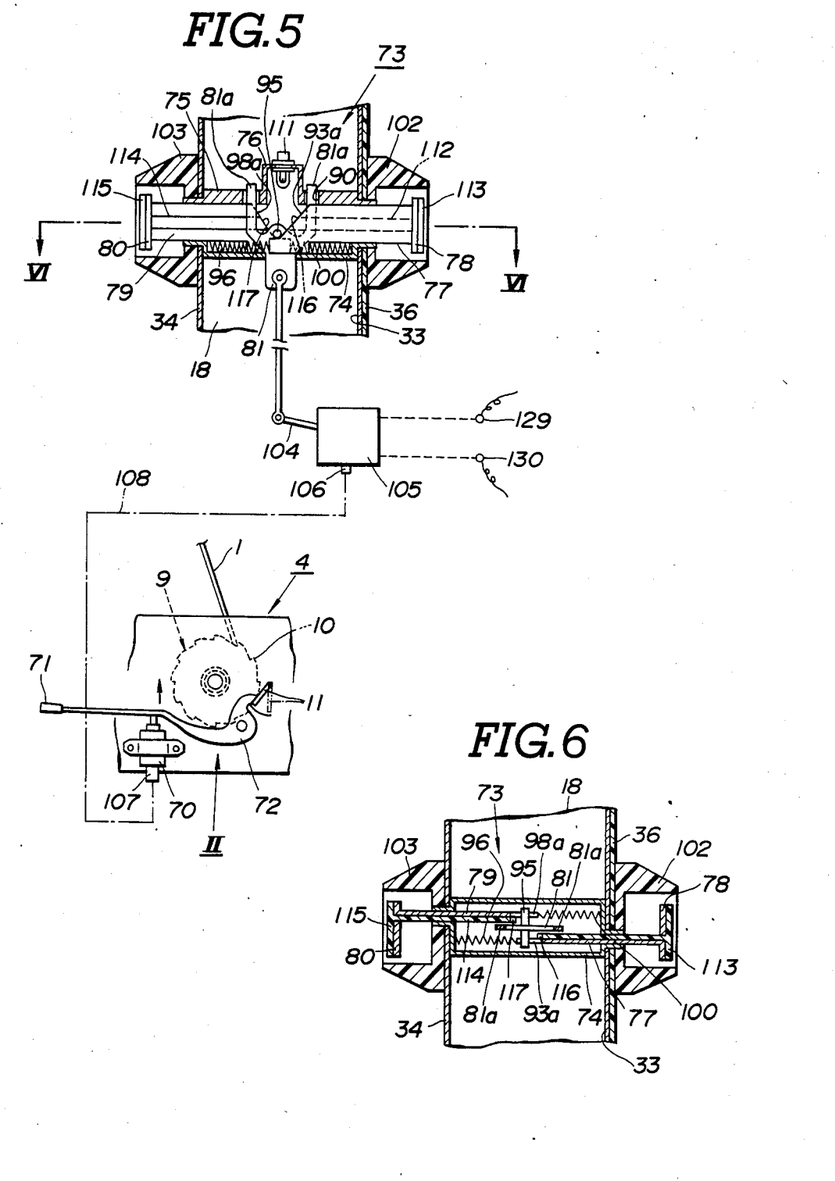
FIG. 5 is a diagram of a release system for a seat occupant in an automotive vehicle according to a second embodiment of this invention.
FIG. 6 is a cross-sectional view taken along the line VI—VI in FIG. 5.

Throughout the following description, elements similar to those of the first embodiment will be labeled with the same reference numerals used in preceding drawings. An emergency spool-release mechanism II differs from the emergency spool-release mechanism I of the first embodiment in that the emergency spool-release mechanism II includes a hydraulic spool-release actuator 70 in place of the Bowden cable 13 and also includes a manual actuation knob 71 fixed to the operating end of a spool-release lever 72 and projecting forwards out of the console box 5.

Figure 7:
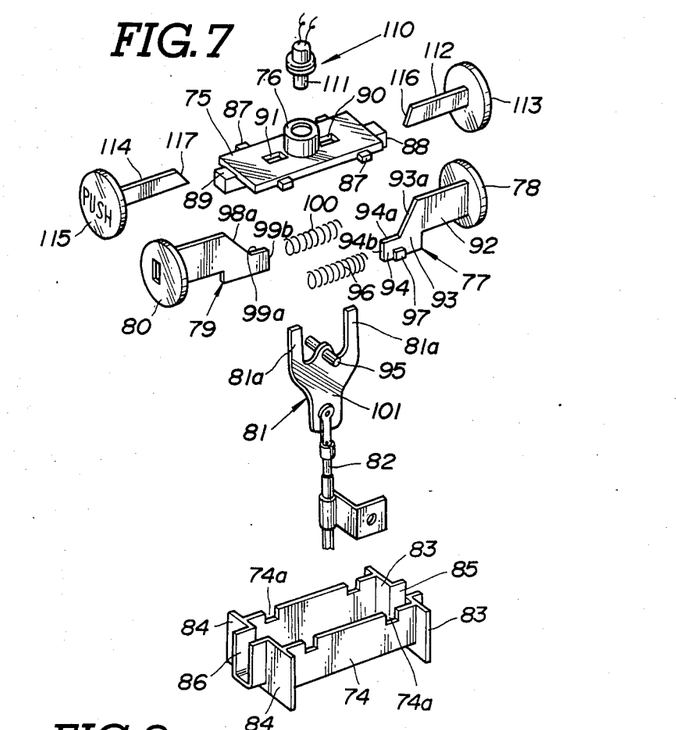
FIG. 7 is an exploded perspective view of the emergency release control of FIG. 5.

A manual emergency release control 73 is mounted at a suitable point on the vehicle body in a manner similar to that of the manual emergency release control 15. As best shown in FIG. 7, the emergency release control 73 comprises a rectangular casing 74 traversing the center pillar 18, a generally rectangular casing upper lid 75 with a lamp socket 76, an inboard slide plate 77 with a disc-shaped inboard emergency release knob 78, an outboard slide plate 79 with a disc-shaped outboard emergency release knob 80, a plate-like control terminal 81 actuable by either of the inboard and outboard slide plates 77 and 79, and a Bowden cable 82 connected to the control terminal 81.

Both ends of the casing 74 have flanges 83 and 84 attached to the inner surfaces of respective pillar inner and outer walls 33 and 34 and also have a pair of inboard and outboard slide bearings 85 and 86. As shown in FIG. 6, the inboard slide bearing 85 lies slightly forward of the outboard slide bearing 86 and as shown in FIG. 5, passes flush through both of the pillar inner wall 33 and the center pillar trim 36. The outboard slide bearing 86 passes flush through the pillar outer wall 34. Thus, the casing 74 is secured to the center pillar 18. The upper edges of the casing 74 have four rectangular notches 74a for engaging four projections 87 provided on the front and rear edge surfaces of the casing upper lid 75.

This casing upper lid 75 has a pair of insertions 88 and 89 at its opposite ends which fill the upper openings of the slide bearings 85, 86 and also has a pair of rectangular guide openings 90 and 91.

As shown in FIG. 6, the inboard slide plate 77 moves in front of the control terminal 81. As shown in FIGS. 5 and 7, the inboard slide plate 77 comprises a straight main part 92 sliding within the inboard slide bearing 85, an operating part 93 and a leading part 94. The main part 92 has a horizontal upper edge sliding along the underside of the casing upper lid 75 and a horizontal lower edge sliding along the floor of the slide bearing 85. The operating part 93 has an oblique upper edge 93a descending toward the front. The oblique upper edge 93a is in sliding contact with a pin 95 of the control terminal 81 so that pushing the inboard slide plate 77 lifts the pin 95 and the control terminal 81 and returning the inboard slide plate 77 lowers the pin 95 and the control terminal 81. The leading part 94 has a horizontal rest upper edge 94a adjoining the lower end of the oblique upper edge 93a and has a vertical front edge 94b adjoining the forward end of the rest upper edge 94a. The pin 95 of the control terminal 81 rests on the rest upper edge 94a in the rest position of the inboard slide plate 77 shown in FIG. 5. The front edge 94b seats one end of a compression coil spring serving as a return spring 96. The other end of the return spring 96 rests on the inner surface of the flange 84. The side surface of the leading part 94 has a projection 97 which abuts a stop (not shown) provided within the casing 74 in the rest position of the inboard slide plate 77 shown in FIG. 5.

The lower edge of the combined operating part 93 and leading part 94 slides along the floor of the casing 74.

An annular inboard finish 102 is fixed to the center pillar trim 36 in such a manner as to surround the inboard emergency release knob 78. Similarly, an annular outboard finish 103 is fixed to the pillar outer wall 34 so as to surround the outboard emergency release knob 80.

As shown in FIGS. 5 and 7, the outboard slide plate 79 has the same structure and function as the inboard slide plate 77 but moves behind the control terminal 81. That is, the outboard slide plate 79 comprises an oblique upper edge 98a similar to the oblique upper edge 93a, a rest upper edge 99a similar to the rest upper edge 94a, and a front edge 99b similar to the front edge 94b. A return spring 100 is seated between the front edge 99b of the outboard slide plate 79 and the inner surface of the flange 83 similarly to the return spring 96.

As best shown in FIG. 7, the upper end of the control terminal 81 forms a yoke. Two branches 81a of the yoke pass freely through the guide openings 90 and 91 in the casing upper lid 75. The above-described pin 95 passes through the center of the control terminal between the branches 81a. The lower part 101 of the control terminal 81 passes freely through an opening in the bottom of the casing 74. One end of the Bowden cable 82 is fixed to the lower end of the lower end 101. The other end of the Bowden cable 82 is fixed to an operating lever 104 of a hydraulic pressure generator 105. An output port 106 of the hydraulic pressure generator 105 is connected to an input port 107 of the hydraulic spool-release actuator 70 via a hydraulic line 108. When the Bowden cable 82 is pulled up, i.e. the operating lever 104 is moved clockwise as viewed in FIG. 5, the hydraulic pressure generator 105 generates a predetermined level of pressure for powering the hydraulic spool-release actuator 70.

As shown in FIGS. 5 to 7, a location indicator 110 works on the principle of so-called edge light illumination and is built into the manual emergency release control 73 to indicate the location of the manual emergency release control 73 right after collision involving this automotive vehicle. The location indicator 110 comprises a periodically flashing or blinking lamp 111 mounted within the lamp socket 76, an inboard photoconductive plate 112 mounted on the backsurface of the inboard slide plate 77, an inboard photo-display disc 113 integral with the inboard edge of the inboard photoconductive plate 112, an outboard photoconductive plate 114 mounted on the front surface of the outboard slide plate 79, and an outboard photo-display disc 115 integral with the outboard edge of the outboard photoconductive plate 114.

Figure 8:
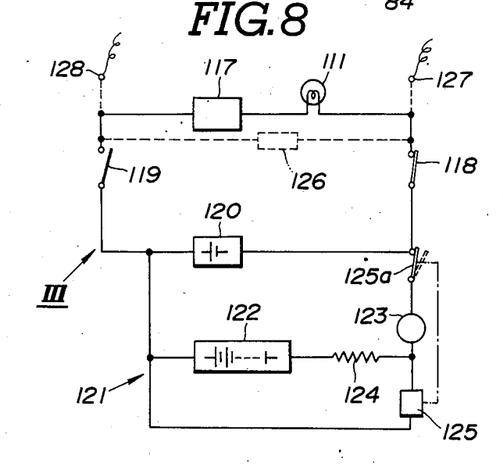
FIG. 8 is an electrical circuit diagram for an indicating lamp of a location indicator of FIG. 5.

The lamp 111 is connected to an electrical circuit III as shown in FIG. 8 and can flash within the lamp socket 76. The inboard photoconductive plate 112 is made of, e.g. transparent or light-transmissive acrylate resin and has a light-receiving oblique edge surface 116 which is flush with the oblique upper edge 93a of the inboard slide plate 77. As best shown in FIG. 6, the inboard end of the inboard photoconductive plate 112 passes flush through a rectangular opening in the inboard emergency release knob 78. The inboard photo-display disc 113 is affixed to the inner surface of the inboard emergency release knob 78. The inner surface of the inboard photo-display disc 113 bears the legend "push". The blinking light from the lamp 111 is received by the light-receiving oblique edge surface 116 and transmitted to the inboard photo-display disc 113 via the body of the inboard photoconductive plate 112. The outboard photoconductive plate 114 has the same form and function as the inboard photoconductive plate 112 and also has a light-receiving oblique edge surface 117.

As shown in FIG. 8, the electrical circuit III for blinking the lamp 111 comprises a flasher unit 117 connected in series to the lamp 111, an ignition or engine key-switch 118 connected in series to the lamp 111, a shock sensor 119 connected serially with the flasher unit 117 and capable of sensing deceleration in excess of a predetermined degree and generating a shock signal in response to abrupt deceleration or collision (i.e. it does not generate the shock signal in response to light shocks), a dedicated battery 120 connected in parallel to both the lamp 111 and the flasher unit 117, and an assist power circuit 121 connected in parallel to the dedicated battery 120.

The assist power circuit 121 comprises a vehicle battery 122 connected in parallel to the dedicated battery 120, a capacitor 123 connected in series to the vehicle battery 122 via a resistor 124, a constant-voltage sensing relay 125 connected in parallel to the vehicle battery 122 and in series to the capacitor 123, and a normally-closed contact 125a of the constant-voltage sensing relay 125 between the dedicated battery 120 and the capacitor 123. The normally-closed contact 125a is opened when the service voltage of the vehicle battery 122 drops below a constant voltage regulated by the constant-voltage sensing relay 125 or when the assist power circuit 121 fails due to, e.g. collision involving the automotive vehicle.

In case of abrupt deceleration or collision, the pawl 11 is forced into engagement with the ratchet wheels 10 by the pendulum so as to lock the spool 9 and the shock sensor 119 turns on so as to blink the lamp 111. When an emergency-restrained seat occupant pushes the inboard emergency release knob 78 by himself, the oblique upper edge 93a lifts the pin 95 and the control terminal 81. Thus, the Bowden cable 82 moves the operating lever 104 clockwise as viewed in FIG. 5 and the hydraulic pressure generator 105 transmits the working pressure to the hydraulic spool-release actuator 70 which disengages the pawl 11 from the ratchet wheels 10 via the spool-release lever 72.

Alternatively, the seat occupant may pull up the spool-release lever 72 in order to disengage the pawl 11 from the ratchet wheels 10.

On the other hand, when a stunned seat occupant cannot push the inboard emergency release knob 78, a rescuer can quickly locate the manual emergency release control 73 by means of the blinking outboard photo-display disc 113 and push the outboard emergency release knob 80 in order to disengage the pawl 11 from the ratchet wheels 10.

The location indicator 110 can quickly indicate for quick rescue the location of the manual emergency release control 73 to the seat occupant and the rescuer not only during the day but also at night.

Alternatively, in place of or in combination with the lamp 111, a location audio-indicating device 126 announcing "here", some alarm sound, or "SOS" may be installed.

Alternatively, the assist power circuit 121 may be eliminated.

Alternatively, in order to guard the automotive vehicle from mischief from outside the vehicle or inadvertent misoperation within the vehicle, a pair of terminals 127 and 128 in the electrical circuit III, constituting a pair of input and output terminals of the shock sensor 119, may be connected to a pair of terminals 129 and 130 of a solenoid controlled mechanism, e.g. solenoid valve or solenoid clutch (both not shown) in the hydraulic pressure generator 105. The solenoid valve can enable the hydraulic line 108 or solenoid clutch can enable the operating lever 104, only when the shock sensor 119 is on.

Figure 9:
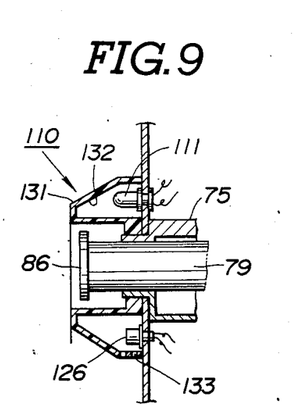
FIG. 9 is a fragmentary sectional view through a modification to the emergency release control of FIG. 5.

FIG. 9 illustrates another embodiment of the location indicator 110. In this embodiment, an outboard finish 131 and/or an inboard finish (not shown) is made of a light-transmissive material and has an annular chamber 132 in which a blinking lamp 111 and the above-described audio-indicating device 126 are installed. A number of holes 133 are drilled in the bottom of the outboard finish 131 opposite the audio device 126. The inboard and outboard photoconductive plates 1112 and 114 in the second embodiment of FIGS. 5 to 7 can be eliminated.

Alternatively, a rod may take the place of the Bowden cable 82 in FIG. 5.

What is claimed is:

1. A release system for a seat occupant restrained by a seat belt in a vehicle, comprising:
    a seat belt retractor having a lock locking said seat belt retractor when a vehicle body experiences more than a predetermined degree of deceleration;
    means for emergency-releasing said seat belt retractor after said seat belt retractor has been locked; and
    an emergency release control comprising:
    (a) a chassis mounted on the vehicle body,
    (b) a manually actuated inboard slider slidably mounted on said chassis,
    (c) a first L-shaped control lever pivotably mounted at an angle thereof on said chassis, said first L-shaped control lever having a relatively long arm pivotally linked with said inboard slider and having a relatively short leg,
    (d) a manually actuated outboard slider slidably mounted on said chassis,
    (e) a second L-shaped control lever pivotably mounted at an angle thereof on the chassis, said second L-shaped control lever having a relatively long arm pivotally linked with said outboard slider and having a relatively short leg, and
    (f) a control terminal movable to exert a control power for actuating said emergency-releasing means, said control terminal being actuably associated with said short leg of said first and said second L-shaped control levers, respectively.

2. A release system as recited in claim 1, wherein said seat belt retractor emergency-releasing means comprises a spool-release lever disabling said lock, and a cable transmitting the control power to actuate said spool-release lever.

3. A release system as recited in claim 2, wherein said seat belt retractor comprises a spool onto which the seat belt is wound which retracts the seat belt and a ratchet wheel fixed to said spool, and wherein said lock comprises a pawl brought into engagement with said ratchet wheel so as to lock said spool in place when the vehicle body experiences more than the predetermined degree of deceleration.

4. A release system as recited in claim 2, wherein said cable is a Bowden cable.

5. A release system as recited in claim 1, wherein said emergency release control is built into a center pillar of the vehicle body.

6. A release system as recited in claim 1, wherein said spool-release lever is disposed within a console box of the vehicle body.

7. A release system for a seat occupant restrained by a seat belt in a vehicle, comprising:
 a seat belt retractor having a lock locking said seat belt retractor when a vehicle body experiences more than a predetermined degree of deceleration;
 means for emergency-releasing said seat belt retractor after said seat belt retractor has been locked; and
 an emergency release control comprising:
 (a) a chassis mounted on the vehicle body,
 (b) a manually actuated outboard slider slidably mounted on said chassis,
 (c) an L-shaped control lever pivotably mounted at an angle thereof on the chassis, said L-shaped control lever having a relatively long arm pivotally linked with said outboard slider and having a relatively short leg, and
 (d) a control terminal movable to exert a control power for actuating said emergency-releasing means, said control terminal being actuably associated with said short leg of said L-shaped control lever.

8. A release system for a seat occupant restrained by a seat belt in a vehicle, comprising:
 a seat belt retractor having a lock locking said seat belt retractor when a vehicle body experiences more than a predetermined degree of deceleration;
 means for emergency-releasing said seat belt retractor after said seat belt retractor has been locked;
 an emergency release control mounted on the vehicle body and comprising a control terminal movable to exert control power for actuating said emergency-releasing means and inboard and outboard manual actuation means for selectably moving said control terminal;
 wherein said control terminal comprises a pin and said inboard manual actuation means comprises an inboard slider manually movable toward the outboard of the vehicle body and having an edge oblique to the direction of movement of said inboard slider, said edge being in contact with a cylindrical surface of said pin and moving said control terminal in response to the movement of said inboard slider; and
 means for indicating the location of said emergency release control when the vehicle body has experienced more than the predetermined degree of deceleration.

9. A release system as recited in claim 8, wherein said control terminal comprises a pin and said outboard manual actuation means comprises an outboard slider manually movable toward the inboard of the vehicle body and having an edge oblique to the direction of movement of said outboard slider, said edge being in contact with a cylindrical surface of the pin and moving said control terminal in response to the movement of said outboard slider.

10. A release system for a seat occupant restrained by a seat belt in a vehicle, comprising:
 a seat belt retractor having a lock locking said seat belt retractor when a vehicle body experiences more than a predetermined degree of deceleration;
 means for emergency-releasing said seat belt retractor after said seat belt retractor has been locked;
 an emergency release control mounted on the vehicle body and comprising a control terminal movable to exert control power for actuating said emergency-releasing means and inboard and outboard manual actuation means for selectably moving the control terminal; and
 means for indicating the location of said emergency release control when the vehicle body has experienced more than the predetermined degree of deceleration; wherein said location indicating means comprises a light source provided between said inboard and outboard manual actuation means, photoconductive means respectively extending to the outboard and inboard of the vehicle body and receiving the light from said light source, photodisplay means mounted on the inboard end of said photoconductive means and the outboard end of the photoconductive means, and a shock sensor sensitive to more than the predetermined degree of deceleration to energize said light source.

11. A release system as recited in claim 10, wherein said respective photoconductive means are fixed to said inboard and outboard manual actuation means.

12. A release system for a seat occupant restrained by a seat belt in a vehicle, comprising:
 a seat belt retractor having a lock locking said seat belt retractor when a vehicle body experiences more than a predetermined degree of deceleration;
 means for emergency-releasing said seat belt retractor after said seat belt retractor has been locked;
 an emergency release control mounted on the vehicle body and comprising a control terminal movable to exert control power for actuating said emergency-releasing means and inboard and outboard manual actuation means for selectably moving the control terminal; and
 means for indicating the location of said emergency release control when the vehicle body has experienced more than the predetermined degree of deceleration;
 wherein said emergency-releasing means comprises a hydraulic actuator driving said lock to a released state and a hydraulic pressure generator having an input lever and supplying said hydraulic actuator with hydraulic pressure; and
 wherein said emergency release control includes a power transmitting cable actuating said input lever.

13. A release system as recited in claim 12, wherein said hydraulic pressure generator is enabled by an engine switch of the vehicle.

14. A release system for a seat occupant restrained by a seat belt in a vehicle, comprising:
 a seat belt retractor having a lock locking said seat belt retractor when a vehicle body experiences more than a predetermined degree of deceleration;

means for emergency-releasing said seat belt retractor after said seat belt retractor has been locked;
an emergency release control mounted on the vehicle body and comprising a control terminal movable to exert control power for actuating said emergency-releasing means and inboard and outboard manual actuation means for selectably moving the control terminal; and
means for indicating the location of said emergency release control when the vehicle body has experienced more than the predetermined degree of deceleration;
wherein said location indicating means comprises a hollow finish having an opening and surrounding an outboard end of said outboard manual actuation means, a light or audio source installed within said finish, and a shock sensor sensitive to more than the predetermined degree of deceleration to energize said light or said audio source, respectively.

15. A release system for a seat occupant restrained by a seat belt in a vehicle, comprising:
a seat belt retractor having a lock locking said seat belt retractor when a vehicle body experiences more than a predetermined degree of deceleration;
means for emergency-releasing said seat belt retractor after said seat belt retractor has been locked;
an emergency release control mounted on the vehicle body and comprising a control terminal movable to exert control power for actuating said emergency-releasing means and inboard and outboard manual actuation means for selectably moving the control terminal; and
means for indicating the location of said emergency release control when the vehicle body has experienced more than the predetermined degree of deceleration;
wherein said location indication means comprises a hollow finish having an opening and surrounding an inboard end of said inboard manual actuation means, a light or audio source installed within said finish, and a shock sensor sensitive to more than the predetermined degree of deceleration to energize said light or said audio source, respectively.

16. A release system for a seat occupant restrained by a seat belt in a vehicle, comprising:
a seat belt retractor having a lock locking said seat belt retractor when a vehicle body experiences more than a predetermined degree of deceleration;
means for emergency-releasing said seat belt retractor after said seat belt retractor has been locked; and
an emergency release control comprising:
(a) a chassis mounted on the vehicle body,
(b) a straight inboard control lever having one end pivotably mounted on said chassis, said inboard control lever being manually actuated,
(c) a straight outboard control lever having one end pivotably mounted on said chassis, said outboard control lever being manually actuated, and
(d) a control terminal movable to exert a control power for actuating said emergency-releasing means said control terminal being actuably associated with an intermediate portion of said inboard and said outboard control levers, respectively.

17. A release system as recited in claim 16, wherein said seat belt retractor emergency-releasing means comprises a spool-release lever disabling said lock, and a cable transmitting the control power to actuate said spool-release lever.

18. A release system as recited in claim 17, wherein said seat belt retractor comprises a spool onto which the seat belt is wound which retracts the seat belt and a ratchet wheel fixed to said spool, and wherein said lock comprises a pawl brought into engagement with said ratchet wheel so as to lock said spool in place when the vehicle body experiences more than the predetermined degree of deceleration.

* * * * *